(12) United States Patent
Allan

(10) Patent No.: US 8,811,409 B2
(45) Date of Patent: Aug. 19, 2014

(54) ROUTING VLAN TAGGED PACKETS TO FAR END ADDRESSES OF VIRTUAL FORWARDING INSTANCES USING SEPARATE ADMINISTRATIONS

(75) Inventor: David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 141 days.

(21) Appl. No.: 13/594,751

(22) Filed: Aug. 24, 2012

(65) Prior Publication Data

US 2013/0322453 A1 Dec. 5, 2013

Related U.S. Application Data

(60) Provisional application No. 61/655,061, filed on Jun. 4, 2012.

(51) Int. Cl.
*H04L 12/28* (2006.01)
*H04L 12/46* (2006.01)

(52) U.S. Cl.
CPC ........ *H04L 12/4662* (2013.01); *H04L 12/4633* (2013.01); *H04L 12/4641* (2013.01)
USPC ....................... 370/395.53; 370/338; 370/392

(58) Field of Classification Search
CPC ... H04L 45/00; H04L 12/4658; H04L 45/745; H04L 12/4633; H04L 12/4641
USPC .......... 370/254–338, 395.3, 395.53, 401–474
IPC ....................... H04L 12/4662,12/4658, 12/4641
See application file for complete search history.

(56) References Cited

U.S. PATENT DOCUMENTS

| | | | | |
|---|---|---|---|---|
| 5,046,308 | A | * | 9/1991 | Longobardi et al. ............ 60/311 |
| 5,742,604 | A | * | 4/1998 | Edsall et al. ................... 370/401 |
| 6,111,876 | A | * | 8/2000 | Frantz et al. ................... 370/392 |
| 6,798,775 | B1 | * | 9/2004 | Bordonaro et al. ........... 370/392 |
| 8,023,515 | B2 | * | 9/2011 | Dobbins et al. .......... 370/395.53 |
| 8,588,088 | B2 | * | 11/2013 | Sinha ............................ 370/252 |
| 2003/0035398 | A1 | * | 2/2003 | Sato ............................... 370/338 |
| 2009/0168666 | A1 | | 7/2009 | Unbehagen et al. |
| 2013/0107887 | A1 | * | 5/2013 | Pearson et al. ................ 370/401 |

* cited by examiner

*Primary Examiner* — Afsar M Qureshi

(57) ABSTRACT

A process is implemented in a network element of a packet data to route packets with embedded virtual local area network information and an IP header to far end addresses of virtual forwarding instances. The method receiving a frame including an embedded virtual network identifier (VNI). The VNI is looked up to identify a virtual forwarding instance (VFI), the VFI having a correlated an I-Component Service Identifier (I-SID) and an internet protocol (IP) to backbone media access control (B-MAC) table that is shared with a set of VFIs each having correlated I-SIDs. The VFI resolves an IP address of the frame to a B-MAC address using the shared IP to B-MAC resolution table and encapsulates the frame with the I-SID and B-MAC; and the frame is then sent to the remote B-MAC address.

21 Claims, 4 Drawing Sheets

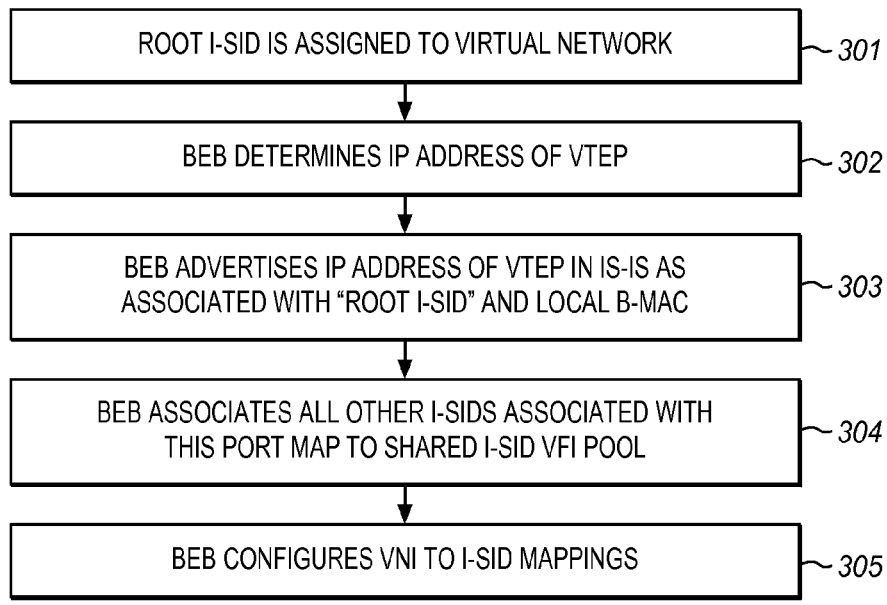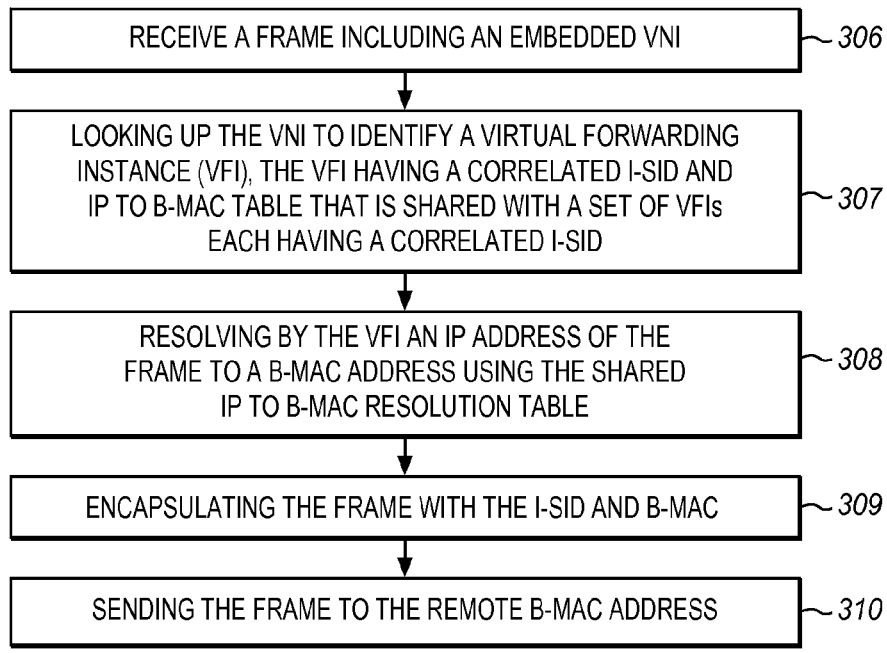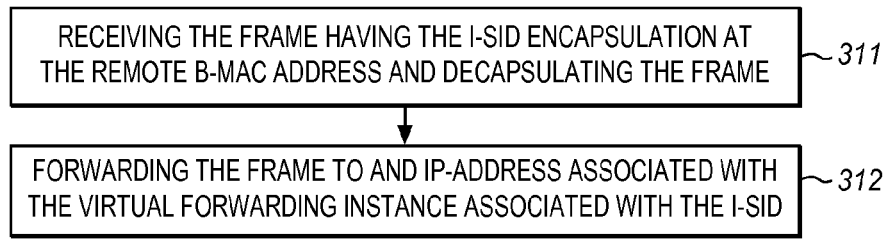

ROUTING VLAN TAGGED PACKETS TO FAR END ADDRESSES OF VIRTUAL FORWARDING INSTANCES USING SEPARATE ADMINISTRATIONS

CROSS-REFERENCE TO RELATED APPLICATION

The present application claims priority from U.S. Provisional Patent Application No. 61/655,061, filed on Jun. 4, 2012.

FIELD

Embodiments of the invention relate to the field of packet classification and routing in data packet communications. Specifically, the embodiments relate to the routing of VLAN or VPN tagged packets to far end addresses of virtual forwarding instances through the use of shared tables.

BACKGROUND

Basic data networking technology has typically been Ethernet based. Conventions for data networking are moving toward IP (Internet Protocol) as a basic foundation. At the same time IP is moving from IP version 4 to IP version 6. During these migrations, in order to support cloud services to diverse tenants, such as IaaS (Infrastructure as a Service), EVB (Edge Virtual Bridging), VPN (Virtual Private Network), and broadcast services, data must be routed through all of these protocols and conventions. At the same time, various proprietary protocols must also be passed intact through network routing. These cloud services must be supported with multiple virtualized instances on a common infrastructure.

A typical cloud service will have multiple VLAN (Virtual Local Area Network) tenants in the cloud. These tenants may use a proprietary Ethernet-based virtualization protocol, such as virtual cloud director networking infrastructure (vCDNI) (a product of VMWare, Inc.), or an IP-based virtualization protocol, such as virtual extensible local area networks (Vx-LAN) (also a product of VMWare, Inc.). In order to provide a consistent virtualization, all of the various virtualization technologies must be supported simultaneously together with efficient virtualized multicast and broadcast. The complexity is further increased because some virtualization systems such as the aforementioned vCDNI and VxLAN use proprietary headers and formats that support addressing fragmentation, and formatting information. These cannot be disturbed or the tenant system will not be able to parse data exchanged via the virtualization system.

In an effort to address some of these concerns, IEEE 802.1aq has specified a routed Ethernet approach to using mesh connectivity. 802.1aq introduces SPBM (Shortest Path Bridging MAC (Media Access Control)) which can also be extended to support L3VPNs forwarding across a link state protocol controlled Ethernet network.

SUMMARY

A process is implemented in a network element of a packet data network to route packets with embedded virtual local area network information and an IP header to far end addresses of virtual forwarding instances. The method receiving a frame including an embedded virtual network identifier (VNI). The VNI is looked up to identify a virtual forwarding instance (VFI), the VFI having a correlated an I-Component Service Identifier (I-SID) and an internet protocol (IP) to backbone media access control (B-MAC) table that is shared with a set of VFIs each having correlated I-SIDs. The VFI resolves an IP address of the frame to a B-MAC address using the shared IP to B-MAC resolution table and encapsulates the frame with the I-SID and B-MAC; and the frame is then sent to the remote B-MAC address.

A network element of a packet data network to route packets with embedded virtual local area network information and an IP header to far end addresses of virtual forwarding instances, the network element includes an ingress module including a server port, ternary content addressable memory (TCAM), and a mapping module. The server port is configured to receive a frame including an embedded virtual network identifier from a virtual machine (VM). The TCAM is configured to identify the VNI of the frame and lookup a virtual forwarding instance having a correlated I-Component Service Identifier and an internet protocol (IP) to backbone media access control (B-MAC) table that is shared with a set of VFIs each having correlated I-SIDs. The mapping module is configured to resolve a destination IP address of the frame to a remote B-MAC address using the shared IP to B-MAC table, and encapsulate the frame with the I-SID and B-MAC. An egress module is configured to send the frame to the remote B-MAC address.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A-C are flow charts of embodiments of processes of configuring and mapping VNIs to I-SIDs as well as handling associated data traffic.

DESCRIPTION OF EMBODIMENTS

Figure 1:
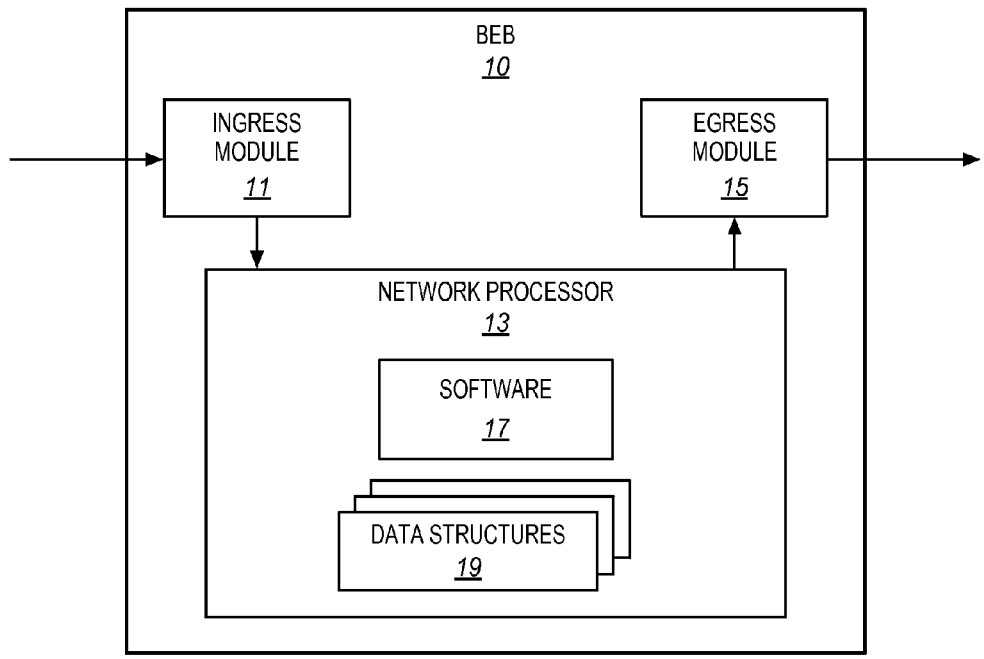
FIG. 1 is a diagram of one embodiment of a network element functioning as an access node according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

References in the specification to "one embodiment," "an embodiment," "an example embodiment," or similar language, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

VxLAN is an "Ethernet over IP" solution that replicates many of the capabilities of vCDNI. vCDNI is a form of MACinMAC (i.e., a protocol that encapsulates a MAC header in MAC header) along with an additional proprietary header that contains, among other things, a fragmentation mechanism and the tenant ID (referred to as a "port group"). A packet leads with a vCDNI MAC header of 14 Bytes, followed by proprietary vCDNI data of 10 Bytes, followed by the source MAC header and then the payload. The source MAC header can contain a payload, a payload E-type, a VM SA (Virtual Machine Source Address)-MAC, and a VM DA (Destination Address)-MAC.

VxLAN is a form of MACinIP (i.e., a protocol that encapsulates MAC reader in an IP header) with a proprietary UDP/IP (User Datagram Protocol/Internet Protocol) encapsulated header that contains the tenant ID. VxLAN is conceptually similar to vCDNI but UDP provides the equivalent fragmentation mechanism. The VxLAN stack in an Ethernet based infrastructure includes an outer Ethernet header, optional outer VLAN tag, outer IP header, UDP header, and VxLAN header, which includes a VxLAN network identifier (VNI), inner MAC, and Payload. This is the same basic information that is used in vCDNI, except that UDP/IP is used to handle fragmentation.

VxLAN is an L2VPN over L3 solution. So to combine it with SPBM under 802.1aq would require a L2VPN over L3 over L2VPN solution to optimize the virtualization of the L2 broadcast domains. Numerous techniques exist to address this ranging from layer interworking of multicast control protocols, to simple layer violations.

The need to virtualize broadcast domains to properly implement customer VLANs creates more difficulties. vCDNI does not have any native broadcast containment mechanism specified so frames intended for one port group are typically distributed to all vCDNI end points. VxLAN offers some improvement using IGMP (Internet Group Management Protocol) and PIM (Protocol Independent Multicast) to scope multicast recipients for broadcast containment. The network management system or other central configuration entity populates this mapping from VNI to IP multicast Group. This results in extreme "chattiness" in networks with large numbers of tenants due to the "soft state" nature of these protocols.

FIG. 1 is a diagram of one embodiment of a network element functioning as a backbone edge bridge (BEB), however, other network elements may have a similar configuration. The network element 10 includes an ingress module 11, an egress module 15 and a network processor 13. The ingress module 11 handles the processing of data packets being received by the network element at the physical link and data link level. The egress module 15 handles the processing and data packets being transmitted by the network element at the physical link and data link level. The ingress and egress modules communicate with VxLAN VTEPs typically located in servers, edge routers, and other network elements through IPv4, IPv6, Ethernet, or any of a variety of other formats and protocols.

The network processor 13 handles the routing, forwarding and higher level processing of the data traffic. The network processor 13 executes software 17 and maintains data structures 19 to perform higher level functions including routing functions, implementing network level policies, packet classification, packet forwarding and similar functions.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data. This data and other data relevant to the functions of the network processor 13 are stored in the data structures 19. These data structures and the processes for managing them are described in further detail herein below in regard to FIGS. 3 and 4.

Figure 2A:
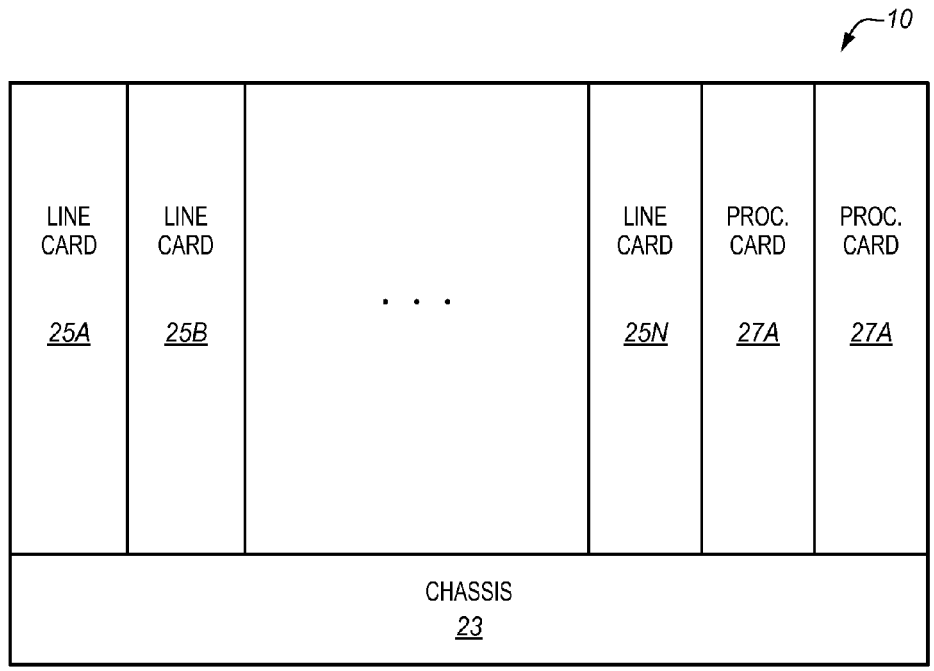
FIG. 2A is a block diagram illustrating the network element of FIG. 1 as a group of line and data processing cards according to one embodiment of the invention.

FIG. 2A is a block diagram illustrating one embodiment of the network element 10 of FIG. 1 as a group of line and data processing cards together with other line cards and the mesh to interconnect them. In one embodiment of the network element, a chassis 23 is coupled to a group of N line cards 25A-N and processing cards 27A, 26B. Additional and other types of devices (not shown) may be coupled to the chassis 23. Packet classification algorithms may be a part of the line cards 25A-N and/or the processing cards 27A-B, alternate embodiments may have alternate card arrangements (i.e., a combined line and processing cards with one or more ports and a forwarding engine, one processing card per line card, multiple processing cards per line card and similar configurations). The data processing cards may build classification trees for use by the line cards or by processing cards. The chassis provides backplane and data plane communication between all of the cards of the network element 10.

In other embodiments, network elements having other architectural configurations can be utilized. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The packet classification and classification building cards in the form of line cards 25A-N, and processor cards 27A-B included in the different network elements include memories, processors and/or Application Specific Integrated Circuits (ASICs). Such memory includes a machine-readable or computer-readable medium on which is stored a set of instructions (i.e., software) embodying any one, or all, of the methodologies described herein. Software can reside, completely or at least partially, within this memory and/or within the processor and/or ASICs. For the purposes of this specification, the terms "machine-readable medium" and "computer-readable medium" shall be taken to include any mechanism that provides (i.e., stores and/or transmits) information in a form readable by a machine (e.g., a computer). For example, a non-transitory computer-readable storage medium includes read only memory (ROM); random access memory (RAM); magnetic disk storage media; optical storage media; flash memory devices); while a transitory machine-readable communication medium include electrical, optical, acoustical or other form of propagated signals (e.g., carrier waves, infrared signals, digital signals, etc.)

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Figure 2B:
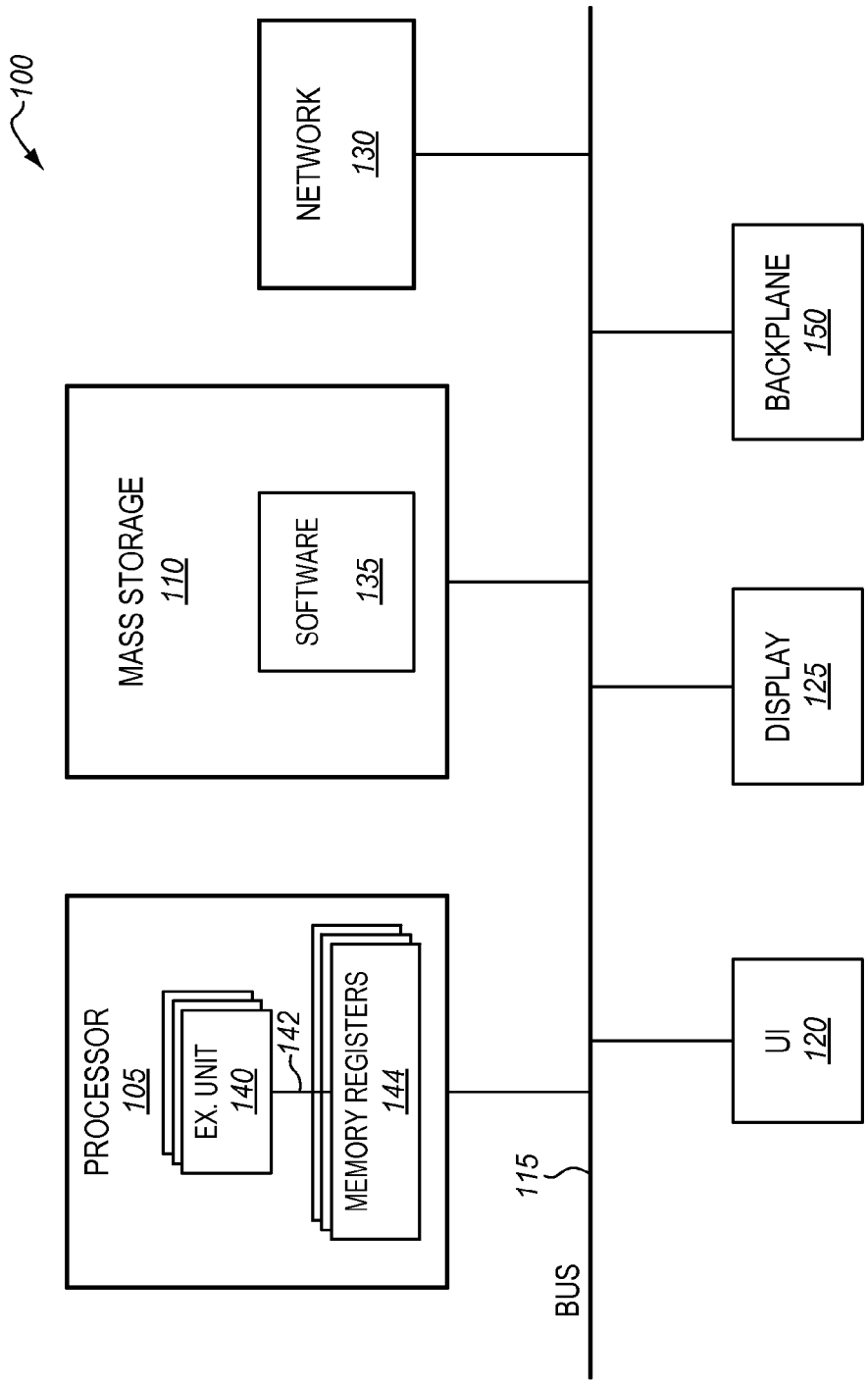
FIG. 2B is a block diagram illustrating an exemplary computer system suitable for use as a network processor according to one embodiment of the invention.

FIG. 2B shows a block diagram illustrating an exemplary computer system 100 capable of functioning as a network element and implementing the functionality described further herein below, according to one embodiment of the invention. The exemplary computer system 100 includes a processor 105 coupled to a storage device 110 by a bus 115. In addition, a number of user input/output devices, such as a keyboard 120 and a display 125, may also be coupled to the bus 115, but are optional parts. A network 130 interface and a backplane 150 interface may also be coupled to bus 115. The processor 105 (single or multi core; and if multi core, symmetrical or asymmetrical cores) includes at least a central processing unit of any type of architecture, such as CISC, RISC, VLIW, or hybrid architecture. The processor 105 may also include a graphics processing unit (e.g., one or more cores), graphic bus interface(s), a memory management unit, and main memory bus interface(s). Furthermore, the processor 105 may be implemented on one or more die within the same chip. The storage device 110 and network traffic represents one or more computer-readable media. Thus, computer-readable media include any mechanism that provides (i.e., stores and/or transmits) information in a form readable by a machine (e.g., a computer). For example, a computer-readable medium may be computer-readable storage media (e.g., magnetic disks; optical disks; random access memory; read only memory; flash memory devices), computer-readable communication media (e.g., electrical, optical, acoustical or other form of propagated signals—such as carrier waves, infrared signals, digital signals, etc.); or similar media. The bus 115 represents one or more busses and bridges. While this embodiment is described in relation to a single processor computer system, other embodiments could include a multi-processor computer system.

FIG. 2B also illustrates that the storage device 110 has stored therein networking software 135 for execution on the processor 105 to provide for the processing and forwarding of incoming data packets and related functions as described herein below. Of course, the storage device 110 preferably contains additional software such as an operating system and similar software.

FIG. 2B additionally illustrates that the processor 105 includes a set of execution units 140, an internal bus 142, and memory/registers 144. Of course, processor 110 and other components of the computer system contain additional circuitry, which is not necessary to understanding the embodiments of the invention.

The internal bus 142 couples several of the elements of the processor 105 together as shown. The execution units 140 are used for executing instructions. The memory/register 144 are used for storing instructions and data currently being executed by the execution units 140.

The term "storage" is used herein to refer to any mechanism for storing data, including locations in the mass storage device 110, one or more registers in the processor 105, etc. The processor 105 may be capable of executing new instructions and/or instructions similar to or the same as those found in existing general-purpose processors. Furthermore, in one embodiment, the processor 105 is a multi-core processor, with at least some of the cores being simultaneous multi-threaded (e.g., hyperthreaded), superscalar, pipelined, and capable of completing one or more of these instructions per clock cycle (ignoring any data dependencies and pipeline freezes).

Overview

The embodiments relate to establishing VXLAN based virtual local area networks over 802.1aq Ethernet networks. In particular, the embodiments relates to establishing VxLAN over Ethernet and addressing specific issues this causes, in particular efficient scoping of VNI specific multicast via mapping to 802.1aq mechanisms. The embodiments can be employed in data centers for supporting cloud services. Data centers house many services as virtual machines (VM) belonging to different tenants (i.e., customers of the data center). This adds additional complexities to the administration of the virtual networks being employed. These goals are achieved as described below by virtualization of the VxLAN via virtual forwarding instances (VFIs) and tables shared across the set of I-SIDs supported by VxLAN that is used for mapping VxLAN IP addresses to B-MAC addresses.

There are basic differences between IEEE 802.1aq and VxLAN. There are also aspects of VxLAN that cannot be modified in routing. Therefore a virtualization of VxLAN for cloud computing may need to occur potentially deeper in the network within those components that are controlled by the cloud operator who is virtualizing multiple instances of VxLAN or other cloud VPN protocols. The virtualization is also more robust if it is properly isolated. However, integrating Ethernet over IP into 802.1aq eliminates many of the benefits of the multicast trees provided by 802.1aq. A layer violation can be created by directly mapping VNIs to 802.1aq I-SIDs, which perform a similar function. Such a mapping allows for VNI multicast trees, and VNI load spreading and obviates the need for more complex interworking of soft state VxLAN multicast control protocols (e.g. internet group management protocol (IGMP)) and 802.1aq intermediate system-intermediate system (IS-IS) protocol.

In addition, if VxLAN is treated as a single L3VPN tenant mapping to a single I-SID then the multipath aspects of full mesh connectivity provided by 802.1aq are lost as well as the benefits of I-SID scoped multicast. Therefore, a more desirable solution is to map VxLAN VNIs to I_SIDs in an approach that is more like an L2VPN on top of an L2VPN with IP information residing in the middle.

Accordingly, VxLAN domains are more robust if they are virtualized so that they can operate without affecting or disturbing the operation of other VxLAN or Ethernet VPNs on a common Shortest Path Bridging MAC-mode (SPBM) infrastructure. The symmetry and congruence of connectivity between any two VNI end points can be preserved with support for multiple administrations of VNI values, and support for multiple administrations of VTEP addresses.

For these reasons, in order to obtain the benefits of 802.1aq and SPBM, distinct mappings between VxLAN VNIs and SPBM constructs can be used. To avoid collisions in a potentially larger tenant space with multiple VxLAN VPNs, VNIs are not algorithmically mapped to I-SIDs, but are separately administered values. Separate mappings and separate administrations are used and a shared table instance only applies to one VxLAN VPN. For the same reasons, multiple administrations are also supported for VxLAN IP addresses. VxLAN IP is not simply routed side by side with and augmented with I-SID based multicast. Routing VxLAN IP independent of I-SID provides no B-VID (Backbone VLAN ID) mapping, and if separated from I-SID based multicast then the congruence of the path between Ethernet BUM (Broadcast, Unknown unicast and Multicast) traffic cannot be guaranteed.

As can be seen from the above, the semantics of VxLAN (and the similar vCDNI) do not line up directly with SPBM. Lining up packet headers with simple overlays on overlays would provide L2 over L2 over SPBM for vCDNI, and L2 over L3 over SPBM for VxLAN. In both cases, the state summarization imposed by strict hierarchy reduces the effective entropy available for SPBM type load spreading. As an example, 50-500 server tenants could be assigned to one hypervisor and therefore treated as one flow for load spreading. This would severely limit load balancing in an 802.1aq implementation.

Further semantics differences are shown by considering the case of exposing the VMware VNI and mapping it to an I-SID. This in theory violates an 802.1aq concept that the I-SID is a subnet and that the I-SID can be a L3VPN ID. If it is sought to map VNIs to I-SIDs and have freedom in mapping I-SIDs to B-VIDs, then it must be possible to associate a VxLAN IP address with multiple I-SIDs, so one L3 address can map to multiple I-SIDs, which effectively results in the IP address appearing in multiple 802.1aq based L2VPNs. This potentially causes a state inflation effect in that the number of states becomes a product of the number of IP addresses multiplied by the number of I-SIDs. Whereas in VxLAN, IP addressing is effectively flat in that there is no IP aggregation. Normally the addressing in each L2VPN is isolated but in the case of VxLAN, the set of L2VPNs associated with a VxLAN VPN as described in this disclosure shares a common topology and administration.

Much of this complexity and inflation of state can be reduced using shared learning. In Ethernet, shared learning allows multiple VLANs to refer to a common MAC forwarding entry (based on the original assumption that multiple VLANs could share a common spanning tree instance). Similarly, 802.1aq offers shared I-SID learning. In embodiments of the present invention, a logical equivalent of shared I-SID learning as applied to L3 addressing can be used. One such example is a shared ARP (Address Resolution Protocol) cache. Multiple I-SIDs can be mapped to a single L3 forwarding table that is common to the set of I-SIDs. This allows state to be collapsed down to the level of one hypervisor address in the table, instead of a hypervisor address for each of the multiple I-SIDs that maps to a VNI. As a result, the complete set of I-SIDs associated with a VxLAN network can be collectively mapped to a single logical L3VPN comprised of a set of 802.1aq L2VPNs. This avoids the state inflation caused by having many individual I-SID mappings to a single VxLAN IP address. On the other hand, load spreading can still be supported via distinct mapping of each VNI/I-SID to B-VID (Backbone VLAN (Virtual Local Area Network ID)) such that each VxLAN instance spreads the load over the set of available B-VIDs.

In addition, for customer MAC layer broadcast some mapping between VNI and I-SID is helpful. In an IGMP mapping of VNI to a multicast group (G) to I-SID, it is unnecessarily complex to track and maintain the IGMP soft state. On the other hand, G may be used to encode VNI per I-SID. The VNI in a frame can be determined then mapped to I-SID. Frames for all source to group pairs (*,G) can be encoded in the DA MMAC (Destination Address Multi-Channel MAC) using IGMP techniques.

Processes

FIG. 3A shows an example process flow to implement the system described above. The operations of FIG. 3A are configuration operations while other operations in other Figures are packet processing operations. Accordingly, some of the operations can be performed once for many packets, while other operations are performed each time a packet is received or forwarded.

At Block 301, a root I-SID is assigned by the network management system or other centralized configuration management system to a virtual network, such as a VxLAN virtual network, although other types of networks and virtualizations can be used instead.

At Block 302, a BEB (Backbone Edge Bridge), or other type of bridge, determines the IP address of a VxLAN VTEP (VxLAN Tunnel End Point), or other type of VLAN tunnel end point, for example by the observation of ARP traffic, or gleaning information from dynamic host configuration protocol (DHCP) transactions initiated by the VTEP at system startup. This allows the BEB to map a VxLAN to 802.1aq, among other advantages. The BEB can receive VTEP IP addressing information from a management server. In one example, each server port associated with a VxLAN domain is mapped to a DHCP (Dynamic Host Configuration Protocol) relay in the TOR (Top of Rack). This may be done through ethertype steering of frames to a common I-SID for that VxLAN instance. In another example, a DHCP relay "learns" the IP address of a VLAN from DHCP traffic to populate advertisements in IS-IS (an SPBB (Shortest Path Backbone Bridging) control protocol). In yet another example, the related DHCP server is reachable via designating a single I-SID to be the "root I-SID" for the L3 VPN and the BEB relays DHCP traffic onto the root I-SID.

At Block 303, knowing the IP address of the VTEP, the BEB advertises the VTEP IP address in IS-IS as associated with the root I-SID assigned to that VxLAN network instance, and a local B-MAC (Backbone MAC) address. As a result, at Block 304 all other I-SIDs that are associated with the port of this root I-SID are mapped to a related shared I-SID VFI (Virtual Forwarding Instance) pool at the BEB. The VFI pool in this way is similar to an internet protocol virtual private network (IPVPN) instance.

At Block 305, the VNI to I-SID mappings are configured at the BEB. This prepares the system for handling incoming frames. These mappings can be pushed down (i.e., originated and propagated through the network) by an integrated management function at a remote server or a local higher layer.

FIG. 3B is a flowchart of one embodiment of the packet processing. At Block 306, incoming Ethernet frames from a VM run on a VxLAN server that transited a V-switch and a VTEP are received at the BEB. These frames have an embedded VNI. The frames have their VNI identified at Block 307, which is used to lookup a VFI, where the VFI has a correlated I-Component service identifier (I-SID) in the BEB. This lookup can utilize the VNI-I-SID table. The VFI also has a correlated IP to B-MAC table that is shared with a set of VFIs each having correlated I-SIDs. At Block 308, these incoming frames are then forwarded to the identified VFI. The destination VxLAN IP address is looked up in the shared IP to B-MAC table and resolved to a remote B-MAC address.

At Block 309, the incoming frames are I-SID and B-MAC encapsulated and, at Block 310 are sent to the remote B-MAC address from the shared table over a network port connecting the BEB to a SPBM network and ultimately to a destination VM through the remote BEB having the remote B-MAC address.

FIG. 3C is a flowchart of one embodiment of a process performed by a network element. At Block 311, the frames arrive at the remote B-MAC address from the BEB and are decapsulated. Based on the network map the frames arrive at the remote VFI identified by the I-SID encapsuled in the frame where, at Block 312, they then IP forwarded to the VM via a remote Vswitch and VTEP. In this context, 'remote' is utilized to identify location relative to the originating VM and related architecture.

Architecture

Figure 4:
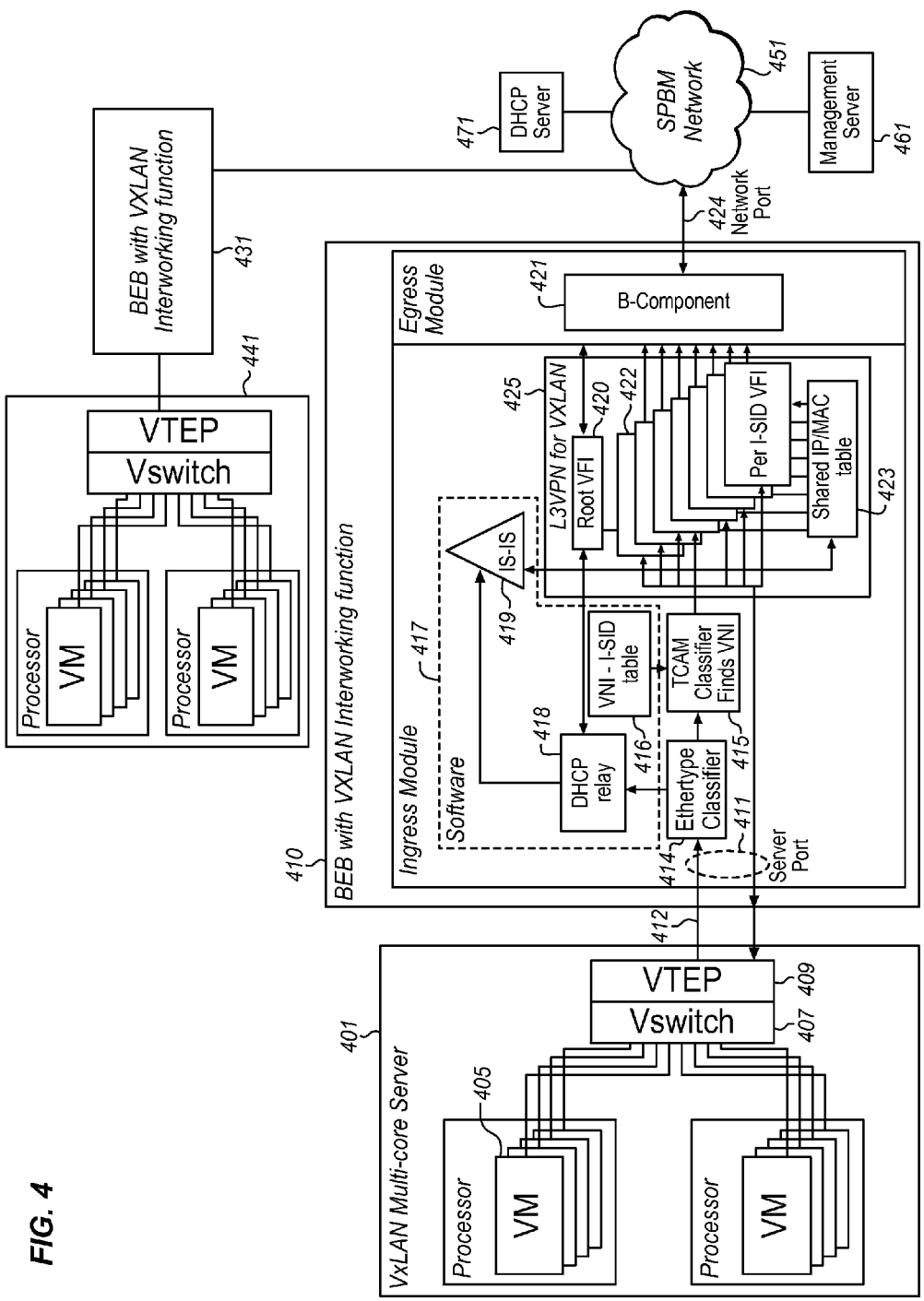
FIG. 4 is a block diagram of a system including a network element for mapping VNIs to I-SIDs according to an embodiment of the invention.

FIG. 4 shows an example configuration of a network element such as a bridge suitable for implementing the operations of FIG. 3B in a network example. The bridge 410 has a server port 411, typically an Ethernet physical connection with an input or incoming connection 412 and an output or outgoing connection 413. Incoming frames are exposed to an ethertype classifier 414 and are then forwarded to a TCAM (Ternary Content Addressable Memory) classifier 415. The classified frames are then applied to mapping tables for multiple instances of VFI (Virtual Forwarding Instance).

The ethertype classifier 414 exposes the incoming frames to determine the IP address of the VTEPs 409 for the frames. In the illustrated example this is done by applying the frames to software processes 417 such as a DHCP relay 418 coupled to a root VFI table 420. This allows the IP address of the VTEP to be obtained by the interworking function. The IP address is then advertised using IS-IS through block 419, which can also be a software process 417. The advertisement will include an association with the root I-SID from the root VFI 420 and the local B-MAC 421.

The TCAM classifier 415 is an example structure for finding the VNI of an incoming frame. As shown, the BEB 410, or other type of network element, has configured a VNI to I-SID Virtual Forwarding Instance (VFI) table 416. This is coupled to the TCAM 415 to allow the VNI of incoming frames to be identified and then forwarded to a mapper 425 that uses the VFI-I-SID mapping table 416 to be map the VNI to an I-SID and the associated VFIs. The mapper includes a shared IP/MAC table 423 coupled to each of the VFIs. The mapper 425 allows the incoming frames, which are L2 frames, to be mapped to L2/L3 VPNs. Frames relayed by the VFI towards the SPBM network have the 802.1aq encapsulation including the I-SID applied.

The incoming frames are mapped to I-Components (i.e., by I-SID) in the mapper 425 as described above and then forwarded to a B-component 421. The B-component then looks up a remote B-MAC address in a BMAC table and fowards the frame on the network port 424. At the remote B-MAC 431 the received frames are decapsulated and IP forwarded through a network port coupled to the B-MAC.

In one example embodiment, the processes and structures are part of a network in a data center or similar location offering cloud services or similar services. The frames can originate at a VM 405 hosted by a VxLAN server 401. The frames can be destined for a VM on a remote VxLAN server or a similar destination. The frames are forwarded to a Vswitch 401 and VTEP 409 which encapsulate the frames before sending the frames to the BEB 410. The BEB 410 processes the frames as described herein above before forwarding across the SPBM 451 to the remote BEB 431 and host server 441 of the destination VM. The network can also include a management server 461 that configures the network and a DHCP server 471 to facilitate address resolution in the network.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. For example, those skilled in the art can appreciate that the princples, processes and structures described herein are applicable to mapping any Ethernet in IP or Ethernet in Ethernet encapsulation onto 802.1aq and that the embodiments provided herein are by way example and not limitation.

What is claimed is:

1. A method in a network element of a packet data network to route packets with embedded virtual local area network information and an IP header to far end addresses of virtual forwarding instances, the method comprising the steps of:
   receiving a frame including an embedded virtual network identifier (VNI);
   looking up the VNI to identify a virtual forwarding instance (VFI), the VFI having a correlated an I-Component Service Identifier (I-SID) and an internet protocol (IP) to backbone media access control (B-MAC) table that is shared with a set of VFIs each having correlated I-SIDs;
   resolving by the VFI an IP address of the frame to a B-MAC address using the shared IP to B-MAC resolution table;
   encapsulating the frame with the I-SID and B-MAC; and
   sending the frame to the remote B-MAC address.

2. The method of claim 1, further comprising the step of:
   mapping the I-SID to a layer 3 virtual private network instantiated as a plurality of L2 VPNs.

3. The method of claim 2, wherein the layer 3 virtual private network is a backbone virtual local area network.

4. The method of claim 1, further comprising the steps of:
   receiving the frame having the I-SID encapsulation at the remote B-MAC address;
   decapsulating the frame; and
   forwarding the frame to an IP address associated with the virtual forwarding instance associated with the I-SID.

5. The method of claim 1, further comprising the step of:
   assigning the I-SID to the virtual forwarding instance before mapping the virtual network identifier to the I-SID, the I-SID being assigned by determining an IP address of a virtual local area network tunnel end point, and advertising the determined IP address with the I-SID and a local B-MAC address.

6. The method of claim 5, wherein the virtual local area network tunnel end point is a VxLAN tunnel end point (VTEP).

7. The method of claim 5, wherein the advertising of the determined IP address comprises advertising the IP address in intermediate system-intermediate system (IS-IS).

8. The method of claim 5, wherein assigning the I-SID further comprises the steps of:
   determining a port of the I-SID; and
   assigning a plurality of I-SIDS that are associated with the determined port to the virtual forwarding instance, the virtual forwarding instance being shared with the plurality of I-SIDS in a pool.

9. The method of claim 8, wherein assigning the I-SID comprises the steps of:
   assigning the I-SID at a backbone edge bridge (BEB), the backbone edge bridge also sending the frame to the remote backbone MAC address.

10. The method of claim 1, further comprising the step of:
    assigning the I-SID to the virtual forwarding instance before mapping the virtual network identifier to the I-SID by receiving mapping information from a management server.

11. The method of claim 1, further comprising the step of:
    assigning the I-SID to the virtual forwarding instance before mapping the virtual network identifier to the I-SID by using a dynamic host configuration relay to learn an IP address of the virtual local area network.

12. A network element of a packet data network to route packets with embedded virtual local area network information and an IP header to far end addresses of virtual forwarding instances, the network element comprising:
    an ingress module including a server port, ternary content addressable memory (TCAM), and a mapping module,
    the server port configured to receive a frame including an embedded virtual network identifier (VNI) from a virtual machine (VM),
    the TCAM configured to identify the VNI of the frame and lookup a virtual forwarding instance having a correlated I-Component Service Identifier (I-SID) and an internet protocol (IP) to backbone media access control (B-MAC) table that is shared with a set of VFIs each having correlated I-SIDs,
    the mapping module configured to resolve a destination IP address of the frame to a remote B-MAC address using the shared IP to B-MAC table, and encapsulate the frame with the I-SID and B-MAC; and an egress module configured to send the frame to the remote B-MAC address.

13. The network element of claim 12, wherein the mapping module is further configured to map the I-SID to a layer 3 virtual private network.

14. The network element of claim 13, wherein the layer 3 virtual private network is a backbone virtual local area network.

15. The network element of claim 12, wherein the mapping module is further configured to assign the I-SID to the virtual forwarding instance before mapping the virtual network identifier to the I-SID, the I-SID being assigned by determining an IP address of a virtual local area network tunnel end point, and advertising the determined IP address with the I-SID and a local backbone MAC address.

16. The network element of claim 15, wherein the virtual local area network tunnel end point is a VxLAN tunnel end point (VTEP).

17. The network element of claim 15, wherein the advertising of the determined IP address comprises advertising the IP address in intermediate system-intermediate system (IS-IS).

18. The network element of claim 15, wherein the mapping module is further configured to determine a port of the I-SID, and assign a plurality of I-SIDs that are associated with the determined port to the virtual forwarding instance, the virtual forwarding instance being shared with the plurality of I-SIDS in a pool.

19. The network element of claim 18, wherein the mapping module is further configured to assign the I-SID at a backbone edge bridge (BEB), the backbone edge bridge also sending the frame to the remote backbone MAC address.

20. The network element of claim 12, wherein the mapping module is configured to assign the I-SID to the virtual forwarding instance before mapping the virtual network identifier to the I-SID by receiving mapping information from a management server.

21. The network element of claim 12, wherein the mapping module is configured to assign the I-SID to the virtual forwarding instance before mapping the virtual network identifier to the I-SID by using a dynamic host configuration relay to learn an IP address of the virtual local area network.

* * * * *

UNITED STATES PATENT AND TRADEMARK OFFICE
CERTIFICATE OF CORRECTION

PATENT NO.        : 8,811,409 B2  
APPLICATION NO.   : 13/594751  
DATED             : August 19, 2014  
INVENTOR(S)       : Allan It is certified that error appears in the above-identified patent and that said Letters Patent is hereby corrected as shown below:

In the Specification

In Column 7, Line 29, delete "processor 110" and insert -- processor 105 --, therefor.

In Column 11, Line 17, delete "B-MAC 431" and insert -- B-MAC 421 --, therefor.

In Column 11, Line 26, delete "Vswitch 401" and insert -- Vswitch 407 --, therefor.

In the Claims

In Column 12, Line 29, in Claim 8, delete "I-SIDS" and insert -- I-SIDs --, therefor.

In Column 12, Line 32, in Claim 8, delete "I-SIDS" and insert -- I-SIDs --, therefor.

In Column 14, Line 5, in Claim 18, delete "I-SIDS" and insert -- I-SIDs --, therefor.

Signed and Sealed this  
Eighteenth Day of August, 2015

Michelle K. Lee  
*Director of the United States Patent and Trademark Office*